United States Patent [19]

Martin et al.

[11] 4,310,751
[45] Jan. 12, 1982

[54] MICROFILM INDEXING MACHINE

[75] Inventors: Gregory K. Martin, East Detroit; Alexander Brunner, West Bloomfield, both of Mich.

[73] Assignee: Visual Systems Corp., Southfield, Mich.

[21] Appl. No.: 36,754

[22] Filed: May 7, 1979

[51] Int. Cl.³ .............................................. G06M 3/06
[52] U.S. Cl. ............................. 235/92 MP; 364/900
[58] Field of Search ........ 235/92 MP, 92 CT, 92 DP, 235/92 EA; 264/900 MS File; 353/26 A, 26 R, 25

[56] References Cited

U.S. PATENT DOCUMENTS

| | | |
|---|---|---|
| 3,868,645 | 2/1975 | Delplanque ........................... 353/25 |
| 3,935,434 | 1/1976 | Rice et al. ...................... 235/92 CT |
| 3,941,981 | 3/1976 | Abe et al. ....................... 235/92 MP |
| 3,999,846 | 12/1976 | Sone et al. ..................... 235/92 MP |
| 4,050,650 | 9/1977 | Wadleigh ......................... 353/26 R |
| 4,139,898 | 2/1979 | Tanaka ................................. 364/900 |
| 4,164,024 | 8/1979 | Gilbert ............................... 364/900 |
| 4,180,321 | 12/1979 | Langrehr ....................... 235/92 CT |
| 4,181,410 | 1/1980 | Sicha et al. .................... 235/92 CT |

*Primary Examiner*—Joseph M. Thesz
*Attorney, Agent, or Firm*—Harness, Dickey & Pierce

[57] ABSTRACT

A microfilm indexing machine for automatically generating an index for a roll of microfilm. The indexing machine can be utilized in combination with either a microfilmer equipped with blip or image count capability to generate an index while the microfilm is being created, or with a microfilm reader to generate an index for an existing roll of microfilm. The indexing machine is a microprocessor based unit that is programmed to respond to the count signals produced by the image marker on a microfilmer or the blip sensors on a microfilm reader. The microprocessor is programmed to process the count signals and automatically update the contents of one or more counters. Document identifications are made via a keyboard and are printed on a paper tape. Upon receipt of the next count signals following the entry of a document identification, the microprocessor is further programmed to print adjacent the identification information the contents of the counter(s) which corresponds to the address location of the identified document on the roll of microfilm. When the index for the entire roll has been completed, the paper tape is removed and preferably microfilmed and spliced to the beginning of the corresponding roll of microfilm.

2 Claims, 6 Drawing Figures

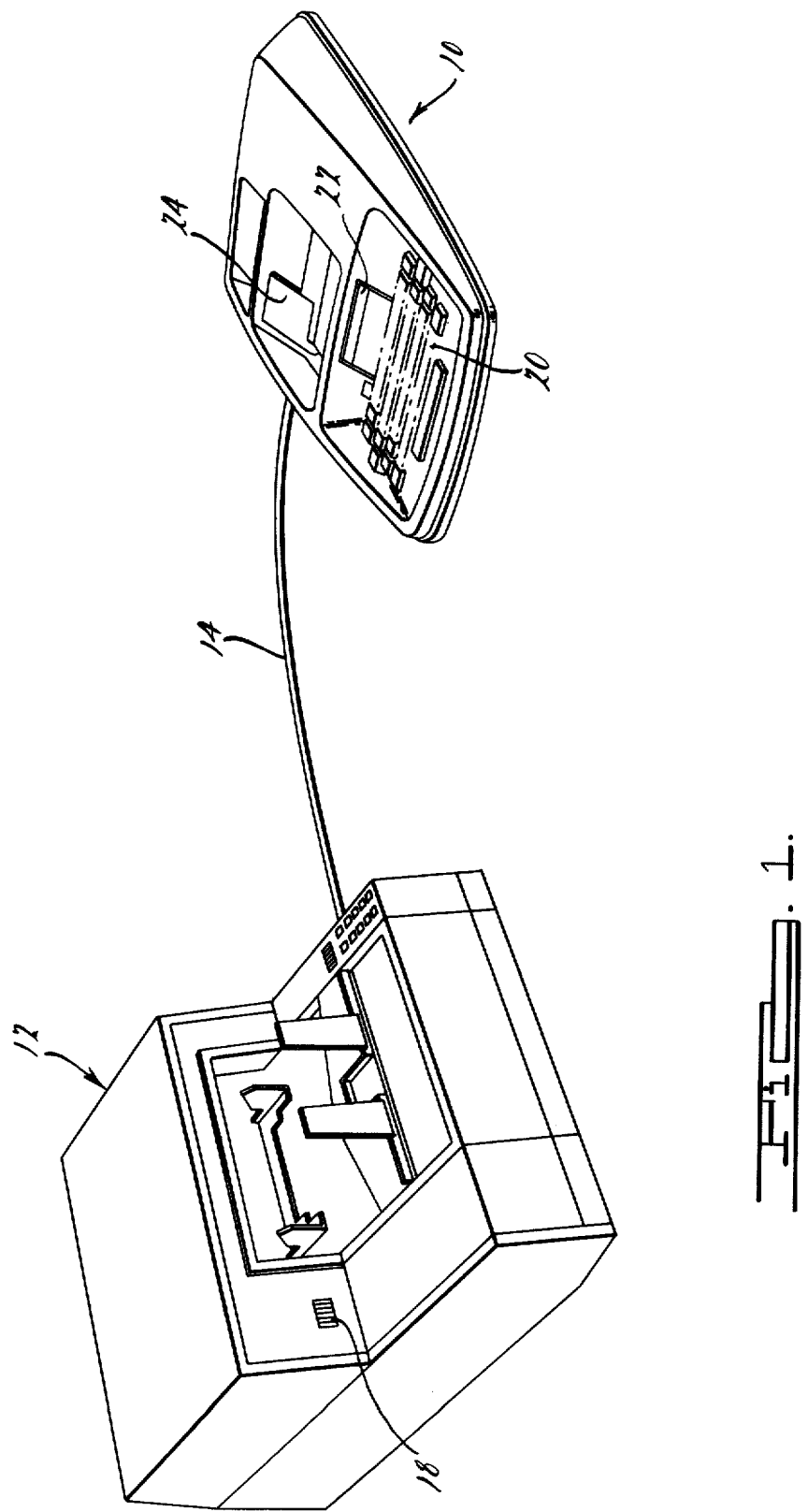

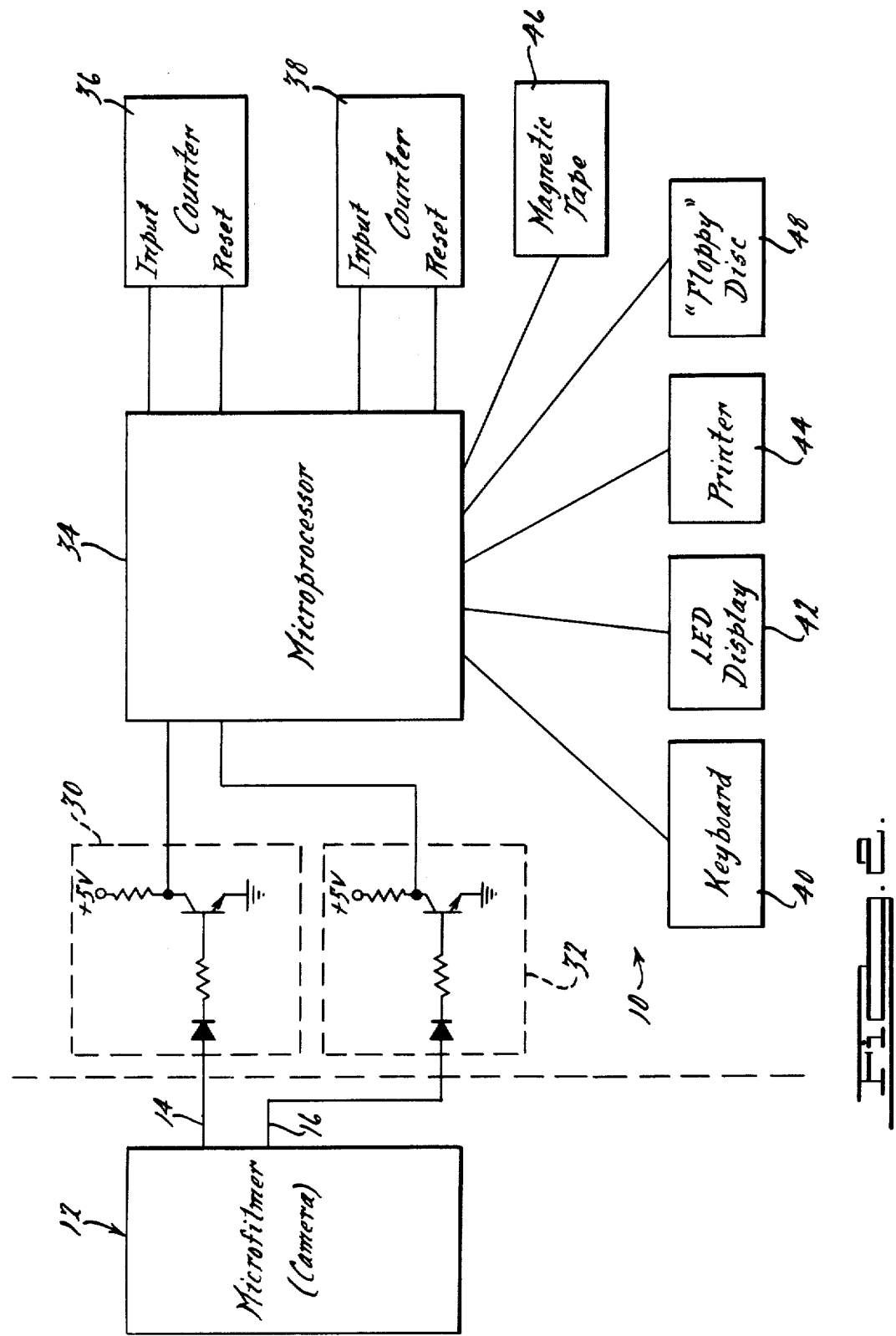

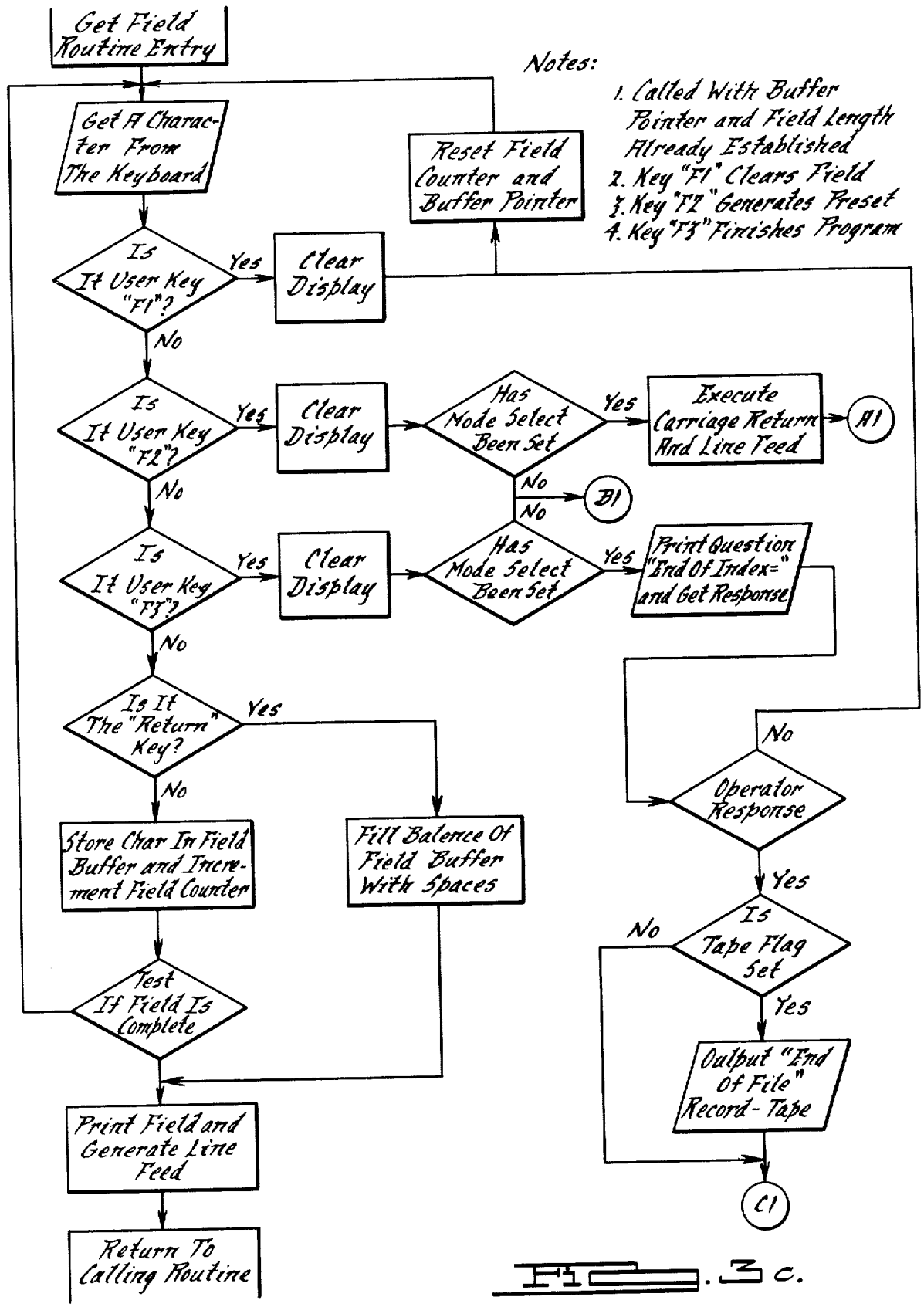

MICROFILM INDEXING MACHINE

BACKGROUND AND SUMMARY OF THE INVENTION

The present invention relates generally to microfilm equipment and in particular to a peripheral indexing machine that is adapted to be utilized in combination with a microfilmer or a microfilm reader to automatically generate an index for a roll of microfilm.

When recording documents on microfilm, it is conventional to have each page of the document(s) rcorded on a separate frame of film. Hence, each each frame of the microfilm corresponds to a single page from the document(s). Typically, the microfilming apparatus places a dark spot, called a marker or "blip", on each frame of the film as the documents are being filmed. The markers are provided for later use by a microfilm reader having "scanning" or "searching" capabilities to count the frames on the reel and automatically advance the film through the reader to the desired document. For an explanation of a sensing circuit for a microfilm reader of this type, see U.S. Pat. No. 4,219,737, issued Aug. 26, 1980, entitled Self Regulating Detection Circuit, assigned to the assignee of the present invention.

The sophistication of the marking system provided by a microfilmer machine varies with the particular machine utilized. Presently, most machines simply place a single marker on each frame of the reel. Some machines, however, provide the additional capability of placing markers above, as well as below, the image on the film. Such a capability can be utilized to identify particular documents as well as specific pages of a document. More particularly, if a document is comprised of 50 pages, for example, an upper marker would be placed on each page of the document and a lower marker would be placed only on the first page of the document. When this is done for all of the documents on a roll of microfilm, it will be appreciated that the upper markers will serve as document indicators and the lower markers will serve as page indicators. Thus, a search request of 10/18 would produce the eighteenth page of the tenth document on the reel. Still other microfilmers have the capability of placing markers of varying lengths on the film to provide further degrees of specificity, such as "page", "chapter" and "book" designations.

However, despite the increasing sophistication of document identification for searching and scanning by microfilm readers, when a reel of microfilm is initially recorded, the index for the reel is still generated manually. In other words, while the documents are being microfilmed, an individual typically records by hand the name of each document and the "address" or location of the document on the reel. Since a typical reel of microfilm may have several thousand frames, it can readily be appreciated that this can be an extremely tedious and time consuming task. Moreover, if a mistake is made in generating the index, it can later lead to the retrieval of improper documents.

It is therefore the primary purpose of the present invention to provide a microfilm indexing machine that automatically generates an index for a reel of microfilm either while the documents are initially being recorded or from an existing roll of microfilm. When utilized in combination with a marker or "blip" generating microfilmer, the present invention permits the operator to enter via a keyboard up to twenty alpha-numeric characters to identify a particular document. Then entry is printed on a paper tape and can optionally be recorded on a magnetic tape and/or a "floppy" disc. The microfilm indexing machine of the present invention then automatically prints adjacent the identification information appearing on the tape the address of the frame on the reel of film where the document will appear. Generally speaking, this is accomplished by counting the markers being created by the microfilmer as the pages of the documents are being filmed. The count is incremented for each frame regardless of whether a document identification entry is made or not. Thus, as will subsequently be described in greater detail, each time an entry is made, the proper address or "blip" retrieval number will automatically be reproduced adjacent the entry on the paper tape. In this manner, an operator can readily compile a complete page locating index for the contents of any given reel of microfilm. In addition, as will readily be appreciated by those skilled in the art, the paper tape may at anytime during the microfilming operation be cut and then microfilmed to provide partial indexing points within the reel. When this is done with a microfilm machine having a multiple blip capability, these partial index points can be "flagged" with upper track blips, for example, so that the indexes can be easily accessed later by an appropriately equipped microfilm reader. Furthermore, upon completion of the reel, the entire page locating index can be microfilmed and spliced to the start of the reel for easy reference.

The present indexing machine is also adaptable for use with a microfilm reader for generating an index for an existing roll of microfilm. In particular, the indexing machine can be "tapped" into the "blip" counting apparatus of the microfilm reader to monitor the frames on the roll. The operator can thus advance the film, stop it where desired, and enter appropriate identifying information on the paper tape. The indexing machine will then automatically print the address location of the frame on the paper tape.

Finally, it will be noted that the present invention may in some cases be utilized to generate indexes for microfilm having no marker identification. Specifically, certain microfilm readers, such as the aforementioned device disclosed in U.S. Pat. No. 4,219,737, issued Aug. 26, 1980, assigned to the assignee of the present invention, have the capability of adjusting their optical sensors which are normally used to read the "blips" on the microfilm, so that the sensors sense entire pages instead of blips. The present indexing machine can then utilize this image sensing information in the same manner as the blip information described previously to automatically count the frame on the roll of microfilm.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is a pictorial diagram of a microfilm indexing machine according to the present invention shown connected to a microfilmer;

FIG. 2 is a block diagram of the microfilm index machine according to the present invention; and FIGS. 3a–3d are a flow chart of the software for the present system.

DETAILED DESCRIPTION OF THE PREFERRED EMBODIMENT

Figure 3A:
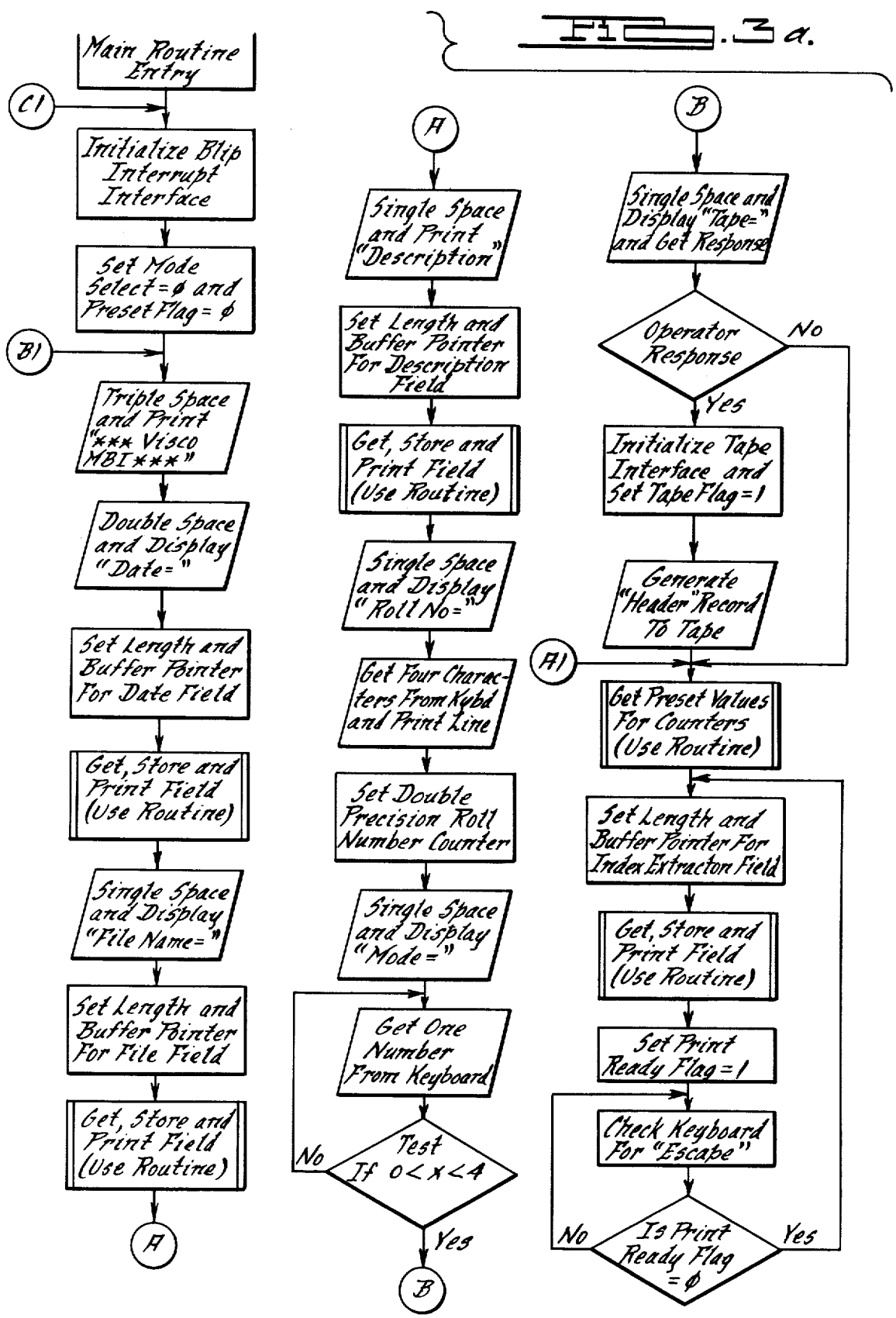
Figure 3B:
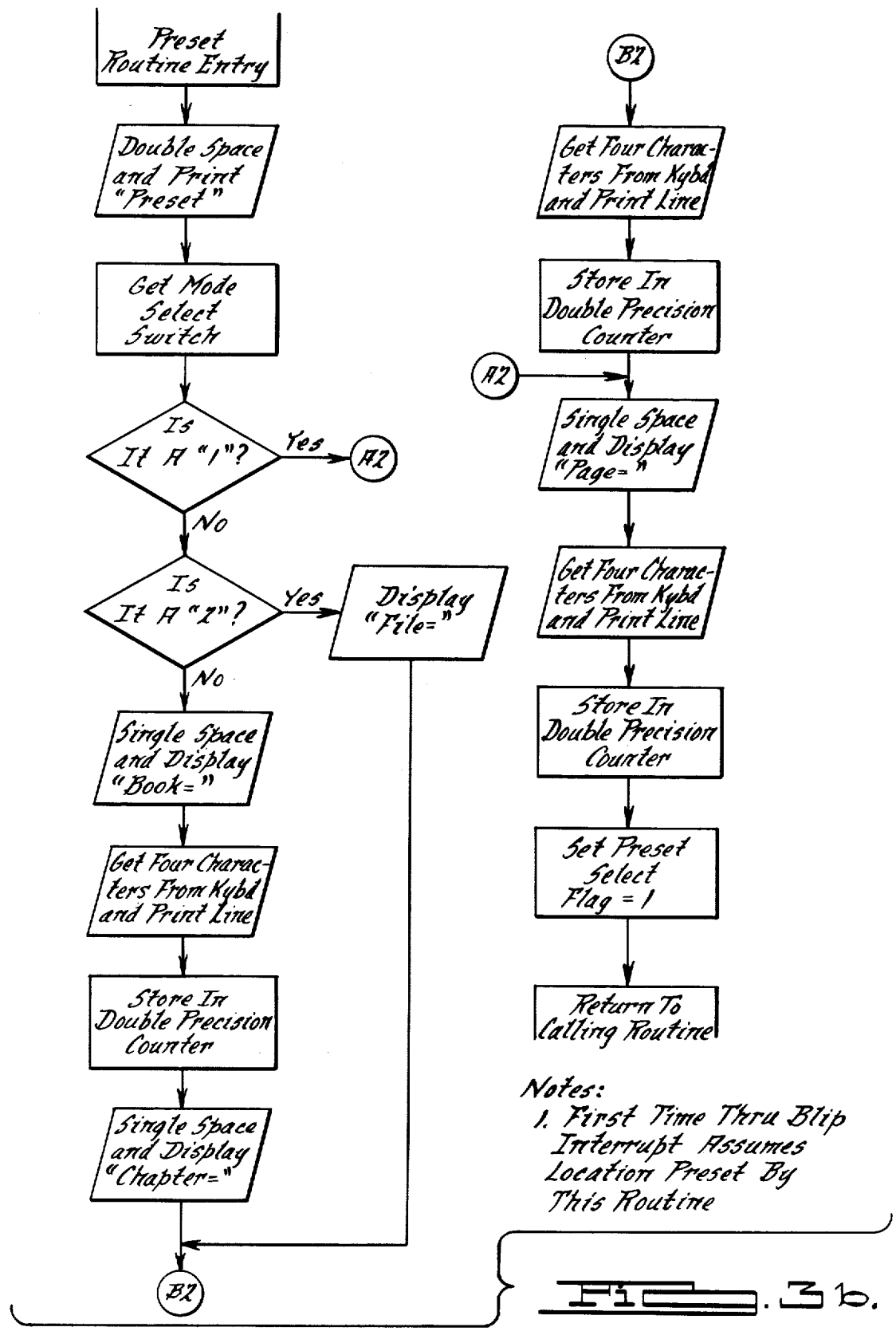
Figure 3D:
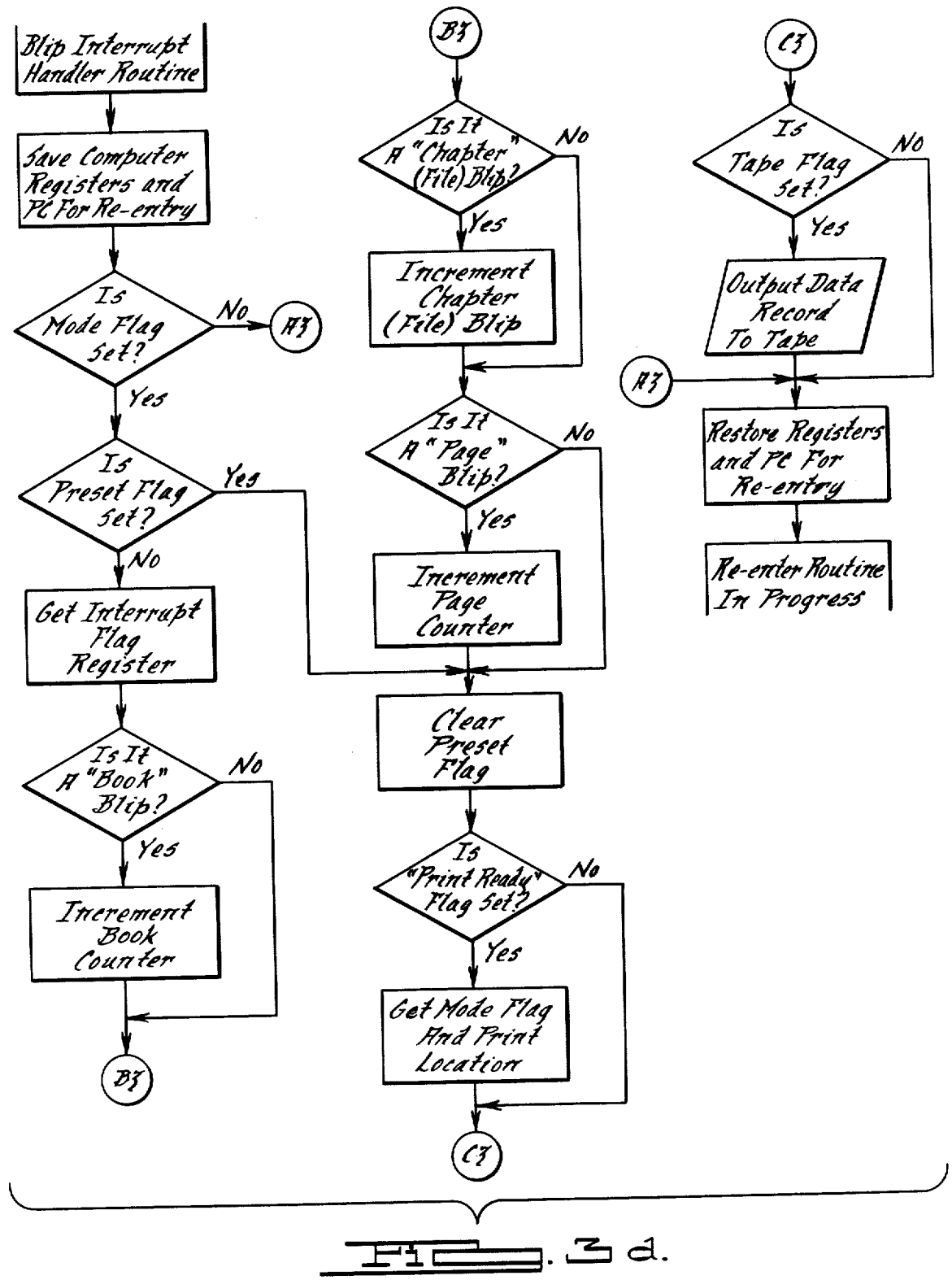

The following description discusses the operation of a microfilm indexing machine according to the present invention when utilized in combination with a microfilmer to automatically generate an index for a roll of film as the microfilm is being created. However, as discussed previously, the present indexing machine is equally applicable for use in combination with a microfilm reader to generate an index for an existing roll of microfilm.

Looking to FIG. 1, a pictorial view of a microfilm indexing machine 10 connected to a conventional microfilmer unit 12 is shown. The operation of microfilmers is well known and therefore will not be explained here in detail. The microfilmer 12 preferably includes an image marker for creating a rectangular mark or "blip" alongside each document image on the microfilm. However, the present indexing machine 10 can also be utilized with a microfilmer which is equipped with only a frame counter 18. The indexing machine 10 is electrically connected via line 14 to the microfilmer 12 so as to receive a count signal from the microfilmer 12 each time a document is microfilmed. This count signal can either be taken off the document counter 18 on the microfilmer or, as is preferred, off the signal line provided to the image marker in the microfilmer 12. When tied to microfilmers having the capability of creating different types of "blips" as discussed above, a separate signal line 14 is provided from the microfilmer 12 for each of the different markers. The purpose for this will be explained in greater detail in connection with the description of FIG. 2.

The indexing machine 10 comprises a microprocessor-based unit having a 64 character ASCII keyboard 20, a twenty character LED visual display 22, and a twenty character printer 24. The microprocessor utilized in the preferred embodiment is a 6500 series microprocessor which includes the necessary peripheral interface adaptors for controlling the various peripheral equipment noted. Additionally included in the unit 10 is a 5K memory to accommodate the necessary software. The basic unit utilized in the preferred embodiment is an AIM-65 manufactured by Rockwell International.

Turning to FIG. 2, a block diagram of a microfilm indexing machine 10 connected to a microfilmer 12 is shown. For purposes of illustration, the block designated "microfilmer" 12 in the drawing is intended to represent a microfilmer having a dual image marker capability. In other words, the microfilmer may, for example, have the capability of generating a blip above as well as below the document image on the film. Alternatively, the two blips may simply comprise rectangular marks of differing lengths generated adjacent the image. In any event, what is significant for purposes of the present description is that the signal lines 14 and 16 are tapped into the control lines connected to the image marking unit within the microfilmer 12 such that when one type of blip is generated a signal is produced on line 14, and when the other type of blip is generated a signal is produced on line 16. If the particular microfilmer unit utilized has only single image marking capability or no image marking capability at all, a single signal line could alternatively be connected to the document counter on the microfilmer 12 to provide the required count input signal to the microprocessor 34.

The two signal lines 14 and 16 from the microfilmer 12 are each provided to an interface circuit, 30 and 32 respectively, which isolates the microprocessor 34 from the microfilmer 12 and "conditions" the signal for processing by the microprocessor 34. The output signals from the interface circuits 30 and 32 are provided to the interrupt inputs of the microprocessor 34. As noted previously, the microprocessor 34 utilized in the preferred embodiment is a 6500 series microprocessor that includes the necessary peripheral interface adaptors to handle the peripheral equipment shown in the drawing. In particular, this includes a 64 character ASCII keyboard 40, a twenty character LED visual display 42, and a twenty character printer 44. Of course, a larger visual display and printer could be used if desired. The microprocessor 34 also includes provisions for driving a magnetic tape unit 46 as well as a floppy disc unit 48 which may be included if it is desired to provide additional indexing documentation on these mediums.

The microprocessor 34 is connected to two counters 36 and 38. The number of counters required corresponds to the number of sense lines from the microfilmer 12. In other words, since the microfilmer 12 used herein has a dual image marking capability, a separate counter is required to count each of the two different types of blips. If, however, the microfilmer used has only a single blip capability, or is equipped with just a document counter, then only one counter would be required. When a count signal is produced on one of the sense lines 14 or 16 by the microfilmer 12, the microprocessor 34 decodes the signal to determine which of the two image markers it corresponds to, and then updates the contents of the appropriate counter 36 or 38.

In the preferred embodiment, the two image markers are utilized for document and page designation as described above. In this configuration, a count signal is produced on sense line 14 and the contents of counter 36 incremented whenever a "document blip" is created by the microfilmer 12, and a count signal is produced on sense line 16 and the contents of counter 38 incremented whenever a "page blip" is created. In addition, the microprocessor 34 is programmed to reset the page counter 38 whenever the document counter 36 is incremented. In this manner, it will be appreciated that at any given time during the microfilming process, the contents of the document counter 36 and page counter 38 uniquely identify each frame of the roll of microfilm. For example, a count of 30/10 corresponds to the tenth page of the thirtieth document on the reel, and a count of 106/18 corresponds to the eighteenth page of document number 106 on the reel.

The generation of the index is accomplished in the following manner. At the outset, the indexing machine 10 is initialized and the counters 36 and 38 are reset to zero. Prior to recording the first document on microfilm, the operator enters on the keyboard 40 information identifying the document to be microfilmed. The information entered via the keyboard 40 is displayed on the LED display 42 for verification. The RETURN key on the keyboard 40 is then depressed and the information is printed by the printer 44 onto a paper tape. Subsequently, upon receipt of the next count signal from the microfilmer 12, the microprocessor 34 is programmed to automatically print onto the paper tape the contents of the counters 36 and 38. Consequently, it can be seen that the address of the document on the microfilm roll is printed on the paper tape directly below the information identifying the documents. As additional documents are microfilmed the microprocessor 34 is programmed to automatically update the contents of the counters 36 and 38 regardless of whether additional document identifications are made. In this manner, whenever an index entry is made and the RETURN key depressed, the microprocessor 34 is programmed, upon receipt of the following count signal, to automatically print the contents of the counters 36 and 38, which as noted will correspond to the address of the document on the roll of microfilm. Thus, the user is free to make index entries as frequently as desired, depending upon the type of documents being microfilmed, and the indexing machine 10 will automatically print the correct address of the document alongside each entry.

Alternatively, it should be noted that when the indexing machine 10 is utilized in combination with a microfilm reader, it may be desirable to program the microprocessor 34 so that it prints the contents of the counters immediately upon depression of the RETURN key on the keyboard.

Upon completion of the index, the paper tape can be removed from the indexing machine 10 and microfilmed and spliced onto the beginning of the roll. In addition, as discussed previously, segments of the index may periodically during the microfilming process be cut and then microfilmed to provide partial indexing points within the roll. Moreover, the address locations of these partial indexes may, of course, be documented on the complete index which is spliced to the beginning of the roll so that the partial indexes can be readily accessed by a microfilm reader.

While the above description constitutes the preferred embodiment of the present invention, it will be appreciated that the invention is susceptible to modification, variation and change without departing from the proper scope or fair meaning of the accompanying claims.

What is claimed is:

1. A microfilm indexing machine for automatically generating an index for a roll of microfilm having document and page markers thereon, comprising:
   signal means for providing a first count signal in response to a document marker and a second count signal in response to a page marker;
   first counter means for counting said first count signals;
   second counter means having a reset input and being adapted for counting said second count signals;
   a keyboard for making document identification index entries;
   recording means including a printer for recording said entries onto a tangible recording medium; and
   microcomputer means for providing a reset signal to the reset input of said second counter means whenever a first count signal is produced by said signal means and being responsive to an index entry made on said keyboard or to the production of a second count signal immediately following an index entry for accessing said first and second counter means and providing to said recording means for recording onto said tangible medium the contents of said first and second counter means such that the document and page address of the document identified by an index entry is automatically recorded onto said recording medium adjacent said identification entry.

2. The indexing machine of claim 1 wherein said signal means is responsive to microfilm image markers.

* * * * *